(12) United States Patent
Grier et al.

(10) Patent No.: US 7,678,222 B2
(45) Date of Patent: Mar. 16, 2010

(54) SYSTEM AND METHOD FOR HOLOGRAPHIC OPTIC TRAP BONDING

(75) Inventors: David G. Grier, New York, NY (US); Kosta Ladavac, Cambridge, MA (US); Joy M. Barker, Albuquerque, NM (US)

(73) Assignees: The United States of America as represented by the Secretary of Commerce, The National Institute of Standards & Technology, Washington, DC (US); New York University, New York, NY (US)

( * ) Notice: Subject to any disclaimer, the term of this patent is extended or adjusted under 35 U.S.C. 154(b) by 0 days.

(21) Appl. No.: 11/473,398

(22) Filed: Jun. 23, 2006

(65) Prior Publication Data

US 2006/0291019 A1   Dec. 28, 2006

Related U.S. Application Data

(60) Provisional application No. 60/693,876, filed on Jun. 24, 2005.

(51) Int. Cl.
*B29C 65/00* (2006.01)

(52) U.S. Cl. ............... 156/272.2; 156/275.5; 156/308.2; 977/882

(58) Field of Classification Search .............. 156/272.2, 156/272.8, 275.5, 296, 308.2; 977/882; 359/1
See application file for complete search history.

(56) References Cited

U.S. PATENT DOCUMENTS 6,294,063 B1 * 9/2001 Becker et al. ............... 204/450

FOREIGN PATENT DOCUMENTS

JP           06225750 A  *  8/1994

OTHER PUBLICATIONS

Plewa et al., "Processing Carbon Nanotubes with Holographic Optical Tweezers," Feb. 14, 2004, pp. 1-4.*
Terray et al., "Fabrication of linear colloidal structures for microfluidic applications," May 2002, pp. 1-3.*
Machine translation of JP 06225750 May 2008.*

* cited by examiner

*Primary Examiner*—John L Goff
(74) *Attorney, Agent, or Firm*—Foley & Lardner LLP

(57) ABSTRACT

A system and method for bonding and unbonding of small objects using small adhesive particles. The system and method includes the use of a plurality of optical tweezers to manipulate objects to be bonded and adhesive particles suspended in a fluid. The objects to be bonded (or unbonded) and the adhesive particles are positioned by lower power optical tweezers and then an intense bonding optical tweezer is activated to cause the adhesive to join the objects together (or used to unbond objects).

17 Claims, 1 Drawing Sheet

SYSTEM AND METHOD FOR HOLOGRAPHIC OPTIC TRAP BONDING

CROSS-REFERENCE TO RELATED PATENT APPLICATIONS

The present application claims priority to U.S. Provisional Application No. 60/693,876, filed on Jun. 24, 2005 and incorporated herein by reference in its entirety.

This work was supported by the National Science Foundation through Grant Number DBI-0233971 and DMR-0451589.

FIELD OF THE INVENTION

The invention relates generally to a method and system for bonding small particles and objects using nanometer to micrometer-sized adhesive particles which are controlled by light beams such as holographic optical tweezers to perform the bonding operation. More particularly, the invention relates to the use of holographic optical tweezers to manipulate, chemically modify and cure small adhesive particles for bonding and other joining operations for small objects.

BACKGROUND OF THE INVENTION

Dramatic progress has recently been made in the field of nanotechnology which has created greatly increased demand in the manipulation of small particles on nanometer to micrometer-sized geometries. For example, it is frequently desirable to form temporary and also permanent bonds which are on a very small scale. This can, for example, be problematic simply because of the small size scale or where the objects to be joined do not normally adhere, or where fusing the objects to establish a bond would involve undesirable chemical or physical changes of state.

SUMMARY OF THE INVENTION

It is therefore an object of the invention to provide an improved system and method for bonding together and unbonding small particles.

It is another object of the invention to provide an improved system and method for applying small adhesive particles to small objects for selectively bonding and unbending them.

It is yet a further object of the invention to provide an improved system and method using a light beam, such as optical tweezers, to manipulate objects and adhesive particles to bond and/or unbond the objects.

It is also an object of the invention to provide an improved system and method using holographic optical tweezers to manipulate, and at least one of chemically transform or heat selected objects and/or adhesive particles to enable bonding and/or unbonding operations.

It is an additional object of the invention to provide an improved system and method for bonding similar or dissimilar objects without need for any special surface preparation.

It is yet another object of the invention to provide an improved system and method for forming permanent bonds and/or temporary bonds among fluid dispersed microscopic objects manipulated by light beams such as holographic optical tweezers or other forms of optical tweezers.

In accordance with the above objects and others explained hereinafter, as well as examples provided, the present invention involves a system and method for forming bonds (and unbending) using adhesive particles manipulated by optical tweezers. Various types of microscopic objects, from nanometer to micrometer size, can be readily bonded together (and unbonded) by judicious manipulation of adhesive particles relative to the objects to be bonded. This system and method also allow co-dispersal of small particles or objects and the adhesive in the same fluid medium.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1A:
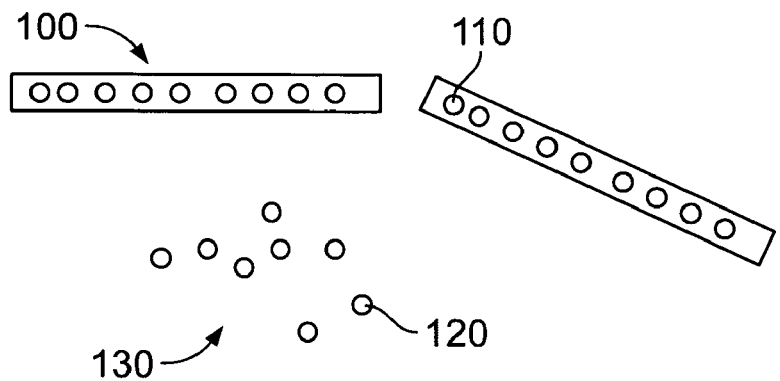
FIG. 1(a) illustrates two objects suspended in a fluid with adhesive particles.

A system and method illustrative of a preferred form of the invention is illustrated in FIGS. 1(a)-1(d). In FIG. 1(a) two objects 100 are trapped by the action of a plurality of light beams, such as optical tweezers 110. Adhesive particles 120, along with the objects 100, are suspended in a fluid medium 130 which typically is a gel or liquid, but could also be any fluid environment capable of suspending the objects 100 and the adhesive particles 120. As shown in FIG. 1(a) the objects 100 are not interacting in any substantial way with the adhesive particles 120, and the optical tweezers 110 are also not interacting with the adhesive particles 120. In an alternative embodiment the adhesive particles 120 and the objects 100 can be manipulated also with the use of optical field gradients, electrical fields and other photonic forces. Such forces can be adjusted to enable movement of the objects 100 and bonding with the adhesive particles 120 and also can be unbonded.

In a preferred embodiment, the adhesive used for the particles 120 should be selected so that the adhesive particles 120 remain stably dispersed in the fluid medium 130 over at least the course of the assembly process and so that they do not ordinarily interact strongly with the objects 100 to be assembled. In the case that the objects 100 are to be manipulated by the optical traps 110, it can be desirable to make the adhesive particles 120 interact only weakly with the optical traps 110, so that they do not interfere with normal manipulation. Once the objects 100 are arranged in the desired configuration, one or more of the particularly intense light beams, such as optical tweezers 140, are trained on the intended junction. This intense illumination forms a bond through any combination of the following described processes.

In another embodiment the optical traps 110 and/or the above-referenced alternative sources for manipulation, bonding and unbonding can be used to initiate chemical changes, chemical bonding, shape rearrangement and other manipulations of the objects 100. The adhesive particles 120 can also be selected to act as dissolving agents for debonding purposes. In addition, the user can have available a mixture of different types of adhesive particles 120, such as particles for etching objects, for debonding and particles for constructing particular electronic, chemical, biological, mechanical and optical structures.

Figure 1B:
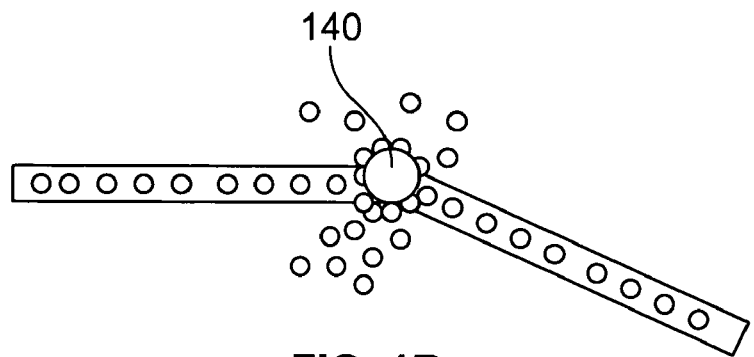
FIG. 1(b) illustrates the two objects of FIG. 1(a) positioned against one another by using optical tweezers and adhesive particles are also collected at the junction by optical tweezers.
Figure 1C:
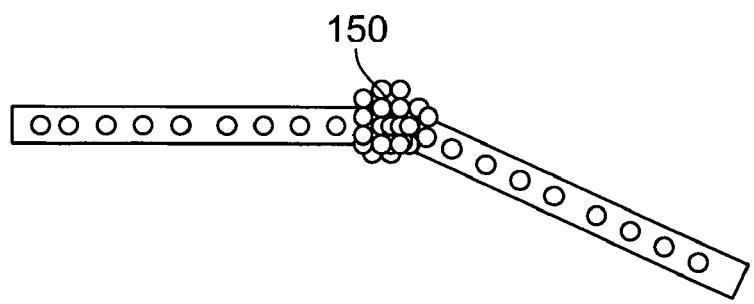
FIG. 1(c) illustrates the system of FIG. 1(b) after turning off the optical tweezers used to position and activate the adhesive particles.
Figure 1D:
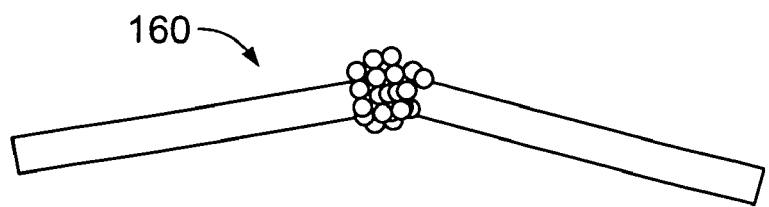
FIG. 1(d) illustrates a finally bonded object.

FIG. 1(b) shows the objects 100 brought into proximity in the desired configuration, and an additional bright or bonding optical tweezer 140 can be trained on the intended junction or joint area. The adhesive particles 120 stream to the junction or joint area, which also is heated by the intense illumination of the tweezer 140. This causes the adhesive particles 120 to fuse to each other and to the objects 100. FIG. 1(c) shows the system after the intense optical tweezer 140 is turned off, and a final bonding joint 150 has been formed. The completed object 160 is shown still localized by the optical tweezers 110, which can be used to manipulate the combined object 160 for other processing, including additional gluing. Once the intense optical tweezer 140 is removed and the bonding joint 150 has cooled, no additional interaction between the adhesive particles 120 and the completed object 160 occurs. FIG. 1(d) shows the completed object 160 without applying the optical tweezers 110 and thus is floating freely in the suspending fluid medium 130.

Whereas an ordinary optical trap, such as the tweezers 110, may not be effective at trapping one of the adhesive particles 120, the intense tweezer 140 may either trap the adhesive particles 120 at the junction or else create a controllable rate of a flux of the adhesive particles 120 flowing toward the junction area. In the case that either the objects 100 to be joined, the adhesive particles 120, or both, absorb some portion of the optical tweezer's incident photon flux. The resulting heating can be used to melt or otherwise fuse the adhesive particles 120 to each other and to the objects 100 to be joined, thereby forming the bonding or "glue" joint 150. Similarly, the intense illumination at the tweezer's 140 focus can be used to excite photochemical transformations that achieve this bonding. In either case, the wavelength and power of laser light and the composition of the adhesive particles 120 can be selected to minimize undesirable transformations in the adhesive particles 120 and objects 100 before bonding and to optimize the final bond after. The resulting bond formed by the adhesive particles 120 can be predetermined such that the bond material can have a desired property, chemically or electrically, such as being a metallic bond, a non-conductor or a semiconductor.

The following non-limiting description provides examples of preferred forms of the invention.

EXAMPLE 1

As a practical demonstration of this system and method, we dispersed vacuum-grown GaN nanowires in a 5:1 mixture of tetrahydrofuran (THF) in water. These cylindrical nanowires, typically measuring 50 nanometers in diameter and 10 micrometers in length are stably dispersed in this solvent for at least several days. Thermoplastic colloidal spheres were codispersed by allowing the solvent to make contact with Norland Type 88 adhesive under ultraviolet illumination at room temperature. The resulting partially photocured plastic spheres are also stably dispersed in this solvent, and do not appear to interact with the nanowires. The fully cured adhesive is thermoplastic with a transition temperature around 50° C. Pairs of nanowires were manipulated into contact with holographic optical tweezers (HOTS), whose intensity was subsequently increased. Increased fluorescence from the nanowires suggests local heating at the wires' ends. The observed formation of bubbles at slightly laser power suggests a steady-state temperature of around 50° C. under experimental conditions. Increasing the trapping laser's intensity also induced a streaming flow of adhesive particles past the junction, leading to a buildup of plastic material as the particles collided with the hot nanowire ends, presumably because the particles melted and stuck. The laser illumination was removed after a visible joint was formed, and the resulting free-floating assembly retained its structure, demonstrating that a rigid bond had been formed.

EXAMPLE 2

As another demonstration of an example of a preferred embodiment, we trained an intense optical tweezer at the edge of a gold electrode evaporated onto the surface of a sapphire substrate in the same solution. Once again, adhesive particles streamed to the locally heated spot, where they formed a rigid structure. Translating the optical tweezer to the edge of the deposited structure permitted further adhesive deposition. Meltflow growth of adhesive structures under optical tweezer control can be used to create three-dimensional structures with features comparable in size to the scale of the adhesive particles and the wavelength of light.

While preferred embodiments have been illustrated and described, it should be understood that changes and modifications can be made therein in accordance with one of ordinary skill in the art without departing from the invention in its broader aspects. Various features of the invention are defined in the following claims.

What is claimed:

1. A method for bonding objects, comprising:
providing a plurality of light beams for manipulating purposes;
providing a fluid medium;
providing at least two objects for bonding to each other and the objects being suspended in the fluid medium;
providing at least one adhesive particle different than the at least two objects to be processed and the at least one adhesive particle suspended in the fluid medium and all of the adhesive particles being unattached to objects; and then
manipulating each of the at least two objects to be processed by using the light beams to directly trap each of the at least two objects to establish a joint area; and then
bonding the two objects together with the at least one adhesive particle by using a bonding light beam to move the at least one adhesive particle to a location near the joint area for establishing a joint bond.

2. The method as defined in claim 1 wherein the light beams comprise optical tweezers.

3. The method as defined in claim 1 wherein the bonding light beam comprises a bonding light tweezer.

4. The method as defined in claim 1 wherein the light beams comprise a controlled optical field gradient.

5. The method as defined in claim 1 wherein the at least two objects are manipulated by a plurality of optical tweezers.

6. The method as defined in claim 1 wherein the at least one adhesive particle is subjected to an intense light beam of controllable intensity to provide at least one of activation of adhesive properties of the adhesive particle and controlling rate of flux of adhesive particles of a bonding site.

7. The method as defined in claim 1 wherein the fluid medium is selected from the group consisting of a gel, a liquid and a gas.

8. The method as defined in claim 1 wherein the at least one adhesive particle comprises a material having properties selected from the group consisting of thermal sensitivity, chemical sensitivity and biological sensitivity, to a bonding light beam and a shape enabling manipulation to allow bonding together of the at least two objects.

9. The method as defined in claim 1 wherein the at least two objects and the at least one adhesive particle comprise nanoparticles of smallest dimension less than about 1000 nm.

10. The method as defined in claim 1 wherein the bond formed is temporary and reversible by applying the bonding light beam.

11. The method as defined in claim 1 wherein the bond formed is permanent.

12. The method as defined in claim 1 wherein the bonding light beam has an adjustable power level associated with the energy level needed for at least one of performing the bonding step and controlling rate of flux to a bonding site of the at least one adhesive particle.

13. The method as defined in claim 1 wherein the at least one adhesive particle has properties such that it interacts only weakly with the light beams used for manipulation purposes.

14. The method as defined in claim 1 wherein the joint bond is selected from the group consisting of a conducting bond, a non-conducting bond and a semiconductor bond.

15. A method for operating on a object, comprising:
providing a plurality of light beams;
providing a fluid medium;
providing an object to be processed and the object being suspended in the fluid medium;
providing at least one adhesive particle different than the object to be processed and the at least one adhesive particle being suspended in the fluid medium and all of the adhesive particles being unattached to any objects;
manipulating the object by interacting with the plurality of light beams and then interacting the at least one adhesive particle with the object by using a bonding light beam to manipulate the at least one adhesive particle; and then
forming a combined structure selected from the group consisting of a bonded structure, a chemically reacted structure and an unbonded structure after a bonded structure is established.

16. The method as defined in claim 15 further including the step of providing a plurality of different adhesive particles to interact with the object in different ways.

17. The method as defined in claim 16 wherein the plurality of different adhesive particles are selected from the group consisting of etchant particles, chemically reactive particles, optically active particles, electrically active particles and particles to dissolve a bond to the object.

* * * * *